United States Patent Office 2,753,328
Patented July 3, 1956

2,753,328

COPOLYMER OF TRIFLUOROCHLOROETHYLENE AND ISOBUTYLENE AND A METHOD OF MANUFACTURING SAME

William S. Barnhart, Cranford, N. J., assignor to The M. W. Kellogg Company, Jersey City, N. J., a corporation of Delaware No Drawing. Application July 23, 1952, Serial No. 300,515

1 Claim. (Cl. 260—87.5)

This invention relates to a copolymer containing halogen. In one aspect the invention relates to a copolymer of trifluorochloroethylene and isobutylene. In another aspect the invention relates to the manufacture of such copolymer.

Halogen-containing polymers and copolymers constitute a relatively new field of chemistry. These halogen-containing copolymers contain a relatively high proportion of halogens. In general such halogen-containing polymers or copolymers are relatively inert and have good physical and chemical stability. Because of these characteristics, the halogen-containing copolymers have many useful applications, such as for coating surfaces to render them corrosive resistant as insulators, and as molded articles of manufacture.

It is an object of this invention to provide a new copolymer having highly desirable physical and chemical characteristics.

Another object of this invention is to provide a thermoplastic material, fibrous in nature and relatively inert.

Another object of this invention is to provide a method for manufacturing a new copolymer.

Various other objects and advantages of the present invention will become apparent to those skilled in the art from the accompanying description and disclosure.

The polymer of the present invention is a thermoplastic copolymer of trifluorochloroethylene and isobutylene. The copolymer of the present invention contains the monomer units in alternate positions in a 1:1 ratio. In general the copolymer is prepared by copolymerizing trifluorochloroethylene with at least its mol equivalent of isobutylene, preferably at least 60 mol per cent isobutylene, at temperatures between about —20° C. and about 60° C. or 70° C. in the presence of a polymerization promoter. Although the isobutylene comonomer may be present in the reaction mixture in an amount as low as about 50 mol per cent, it is preferable to maintain a mol excess of isobutylene.

The copolymer of this invention has many desirable physical and chemical characteristics. Many of the copolymers and polymers of the halogenated olefins are relatively low melting and are of low crystallinity and lack constant polymer composition. The copolymer of the present invention is a perfect 1:1 copolymer containing the monomer groups in alternate positions in the copolymer chain. As a result of the 1:1 composition, the copolymer is highly orientable and maintains orientation at temperatures above 100° C. This feature makes the present copolymer a highly desirable synthetic fiber. The copolymer of the present invention may be stretched to ten times its original length. It has a relatively low solubility and a high melting point for a copolymer containing both halogen and hydrogen.

The presence of fluorine in the copolymer renders the solid copolymer substantially inert and chemically stable. The thermoplastic copolymer of the present invention is substantially colorless and transparent when compressed in molded form. The solid copolymer is substantially chemically stable after prolonged exposure to acids and caustic solutions and other vigorous oxidizing materials. The plastic form of the copolymer is flexible and resilient. The plastic copolymer can be molded at conventional molding conditions at a temperature above about 200° C.

The ability to obtain a 1:1 copolymer with alternate groups of comonomers in the copolymer chain is believed to be due to the fact that isobutylene is very difficult, if not impossible, to homopolymerize when peroxide promoters are used. Also, trifluorochloroethylene is not a readily homopolymerizable substance and requires special technique and conditions for its polymerization. These two characteristics of the comonomers of the present copolymer means that the isobutylene will not form adjacent groups in the chain or homopolymerize and the tendency for the trifluorochloroethylene to also form adjacent groups in the chain is also minimized. As a result of these characteristics the copolymer of the present invention has a perfect 1:1 ratio of comonomers which alternate in the polymer chain. The use of excess isobutylene assures the appropriate amount of isobutylene for the copolymer chain to form the 1:1 ratio of comonomers and without permitting the formation of adjacent groups of trifluorochloroethylene in the chain.

In the preparation of the plastic copolymer of trifluorochloroethylene and isobutylene, the monomers are mixed and maintained at a temperature between about —20° C. and about 70° C. for a period of time between about 30 minutes and about 12 days depending upon such factors as the particular temperature and promoter employed. The preferred temperature of polymerization is between about —10° C. and about 60° C. employing a suitable promoter.

In general organic peroxide promoters, such as the acetyl peroxides, are employed when the copolymer is prepared in the absence of a suspension agent. Acetyl peroxide is the preferred promoter in this instance. Various other organic peroxides, such as trifluoroacetyl peroxide, difluorochloroacetyl peroxide, 2,4-dichlorobenzoyl peroxide, chloroacetyl peroxide, trifluorodichloropropionyl peroxide, benzoyl peroxide and dichlorofluoroacetyl peroxide are also suitable for promoting the copolymerization.

The polymerization may be effected in the presence of a liquid suspension agent, such as water, or an organic liquid, such as hydrocarbon oils, or the liquefied monomers themselves, without departing from the scope of this invention. These suspension agents are diluents in which the monomers and copolymer are suspended during polymerization and serve to withdraw heat from the polymerization. In the case of water emulsion polymerization, the preferred promoters include the inorganic promoters, such as the persulfates, perborates, peroxides and perphosphates. Of these, potassium persulfate is preferred. The weight ratio of suspension agent or diluent to total monomer is between about 0.05 to about 10. Also, in employing the suspension type of polymerization relatively higher temperatures above the freezing point of the reaction mixture are employed.

The concentration of promoter in the polymerization mixture varies over a considerable range but, generally, is within the range of between about 0.01 to about 5 weight per cent based on total monomer in the reactor. The concentration will vary depending upon the ultimate molecular weight of the copolymer desired and upon the method of polymerization employed. For example, for the highest molecular weight product, the minimum amount of promoter is preferable. Also, in a continuous process in which the concentration of the promoter may be maintained relatively constant within narrow limits, the concentration of the promoter in the reaction zone will, therefore, correspond substantially at all times to the preferred composition for the particular product being produced. On the other hand in batch or bulk polymerization, excess promoter is employed initially, which concentration decreases by consumption during polymerization.

Various activators, and accelerators may be employed in conjunction with the promoter without departing from the scope of this invention. These activators are particularly useful in the suspension type of technique of polymerization when water is used as the suspension agent. Sodium bisulfite is an example of a suitable activator in aqueous emulsion polymerization. An example of a suitable accelerator is iron sulfate. The polymerization may also be effected in the presence of fillers or coloring agents, such as carbon black, titanium dioxide, asbestos, etc., without departing from the scope of this invention.

In bulk polymerization in which the polymerization is permitted to proceed until the monomers are converted to the desired plastic, the form of the product is a porous solid plug containing unreacted monomer in the interstices of the solid plug of copolymer. In the type of polymerization in which the copolymer is permitted to form a slurry in a mass of liquid reaction medium, the copolymer is recovered as finely divided particles from the slurry by filtration or other conventional means. This is particularly the case in aqueous suspension polymerization, but is not confined to that type of polymerization since the monomers themselves in the liquid state may constitute the suspension agent.

After the copolymer has been recovered it is usually treated to remove unreacted monomer by vaporization and then the recovered copolymer, if not already in the form of finely divided particles, is broken up into smaller fragments for further handling.

A method of applying the plastic copolymer of this invention to surfaces includes dissolving the copolymer in a suitable solvent and evaporating the solvent after application of the solution to the surface to be coated. If insufficient thickness is obtained after one application of the solution, the procedure may be repeated until a sufficient film thickness is obtained.

The following examples are offered as a better understanding of the present invention and are not to be construed as unnecessarily limiting to the invention:

Example I

Trifluorochloroethylene was admixed with mol excess of isobutylene in a reaction vessel. An 8% yield of copolymer was obtained in 60 hours at 50° C. with 0.1% acetyl peroxide. Halogen analysis showed the product to contain 19.7% Cl and 31.25% F which agrees well with the theoretical values of 20.4% Cl and 32.9% F required for a perfect 1:1 copolymer. The copolymer melts above 170° C. and readily strings from the melt. Film strips could be hot stretched and oriented 300% with only 10–15% shrinkage in boiling water. The film was not dissolved by ethyl acetate and/or toluene nor attached by fuming nitric acid at 60° C. for 8 hours. From an X-ray diagram of oriented film, an identity period of four carbon atoms is indicated. This copolymer is extremely suitable for a stable fluorine-containing filament or fiber.

Example II

Substantially equal mol amounts of trifluorochloroethylene and isobutylene were admixed with 50 parts of water and 0.1 part of potassium persulfate. Polymerization for 60 hours at 50° C. yielded 7 parts (14%) of copolymer which analyzed to contain 20.1% Cl and 32.0% F.

Having described my invention, I claim:

A process which comprises introducing substantially equal mole amounts of trifluorochloroethylene and isobutylene in admixture with 50 parts of water and 0.1 part of potassium persulfate into a polymerization zone, maintaining the aforesaid ingredients at a temperature of 50° C. for 60 hours to produce a copolymer containing about 20 per cent chlorine and about 32 per cent fluorine.

References Cited in the file of this patent

UNITED STATES PATENTS

| | | |
|---|---|---|
| 2,392,378 | Hanford | Jan. 8, 1946 |
| 2,479,367 | Joyce | Aug. 16, 1949 |

OTHER REFERENCES

C & E News, page 4834, November 11, 1952.